US011845421B2

(12) United States Patent
Von Holst et al.

(10) Patent No.: US 11,845,421 B2
(45) Date of Patent: Dec. 19, 2023

(54) LOADER STABILITY SYSTEM

(71) Applicant: Deere & Company, Moline, IL (US)

(72) Inventors: Christian A. Von Holst, Hettenleidelheim (DE); Nathanael K. Rehn, Waterloo, IA (US); Jacob M. Mazanec, Waterloo, IA (US); Jacob M. Kongs, Marysville, KS (US); Anthony D'Alessandro, Cedar Falls, IA (US); Lowell Stutzman, Cedar Falls, IA (US); Kyle A. Maakestad, Clarksville, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 17/078,349

(22) Filed: Oct. 23, 2020

(65) Prior Publication Data

US 2022/0126816 A1   Apr. 28, 2022

(51) Int. Cl.
*B60W 30/02* (2012.01)
*B60W 40/13* (2012.01)
*B60W 30/18* (2012.01)
*B60Q 9/00* (2006.01)
(Continued)

(52) U.S. Cl.
CPC .............. *B60W 30/02* (2013.01); *B60Q 9/00* (2013.01); *B60W 30/18145* (2013.01); *B60W 40/13* (2013.01); *E02F 9/2058* (2013.01); *B60W 2040/1315* (2013.01); *B60W 2400/00* (2013.01); *B60W 2520/12* (2013.01); *B60W 2530/00* (2013.01); *B60W 2540/18* (2013.01);
(Continued)

(58) Field of Classification Search
CPC ........... B60W 30/02; B60W 30/18145; B60W 40/13; B60W 2040/1315; B60W 2400/00; B60W 2520/12; B60W 2530/00; B60W 2540/18; B60W 2720/00; B60W 2720/12; B60Q 9/00; E02F 9/2058; E02F 3/34
See application file for complete search history.

(56) References Cited

U.S. PATENT DOCUMENTS

| 6,437,701 | B1 | 8/2002 | Muller |
| 8,818,699 | B2 | 8/2014 | Nichols et al. |
| 9,593,469 | B2 | 3/2017 | Taylor et al. |

(Continued)

FOREIGN PATENT DOCUMENTS

| CN | 108407800 A | 8/2018 | |
| GB | 2290149 A | * 12/1995 | ............ B66F 17/003 |

OTHER PUBLICATIONS

GB2290149A—Machine translation (Year: 1994).*
German Search Report issued in application No. 102021210502.5, dated Aug. 29, 2022, 10 pages.

*Primary Examiner* — Anne Marie Antonucci
*Assistant Examiner* — Jingli Wang
(74) *Attorney, Agent, or Firm* — Joseph R. Kelly; Kelly, Holt & Christenson PLLC

(57) ABSTRACT

A mobile work machine includes a propulsion subsystem that propel the mobile work machine about a worksite. The mobile work machine includes a steering subsystem that steers the mobile work machine about the worksite. The mobile work machine includes a stability determination system that determines a stability factor based on a characteristic of the steering subsystem. The mobile work machine also includes a control system that controls the mobile work machine based on the stability factor.

15 Claims, 8 Drawing Sheets

(51) Int. Cl.
  *E02F 9/20*  (2006.01)
  *E02F 3/34*  (2006.01)
(52) U.S. Cl.
  CPC ..... *B60W 2720/00* (2013.01); *B60W 2720/12* (2013.01); *E02F 3/34* (2013.01)

(56) References Cited

U.S. PATENT DOCUMENTS

| | | | |
|---|---|---|---|
| 2006/0076741 A1* | 4/2006 | Lim | B60G 17/015 |
| | | | 280/5.508 |
| 2009/0057065 A1* | 3/2009 | Akaki | B60T 7/126 |
| | | | 187/223 |
| 2013/0197760 A1* | 8/2013 | Castaneda | B66F 9/07568 |
| | | | 701/41 |
| 2016/0037708 A1* | 2/2016 | Johnson | A01B 79/005 |
| | | | 701/70 |
| 2018/0201156 A1* | 7/2018 | Mangette | B60L 15/2036 |
| 2018/0251066 A1* | 9/2018 | Murata | B60Q 9/00 |
| 2019/0100205 A1 | 4/2019 | Kean et al. | |
| 2019/0264418 A1 | 8/2019 | Meyers et al. | |
| 2019/0264419 A1 | 8/2019 | Myers et al. | |
| 2020/0032488 A1* | 1/2020 | Kean | B60W 50/08 |
| 2020/0141088 A1 | 5/2020 | Meyers et al. | |
| 2020/0393839 A1* | 12/2020 | Hasegawa | B66F 9/07568 |
| 2022/0041158 A1* | 2/2022 | Notohardjono | G06F 30/27 |

\* cited by examiner

LOADER STABILITY SYSTEM

FIELD OF THE DESCRIPTION

This description generally relates to agricultural or construction equipment. More specifically, but not by limitation, the present description relates to a system for maintaining stability of a loader equipped tractor.

BACKGROUND

There is a wide variety of different types of agricultural and construction equipment. Some such equipment includes tractors that can be equipped with a variety of different attachments. These attachments can expand the range of operations that the tractor can perform. For example, attachments can include front loaders, back hoes, etc. A downside to equipping an attachment to a stock machine is that the weight distribution of the machine may be altered such that the machine can have increased tipping or other stability issues.

The discussion above is merely provided for general background information and is not intended to be used as an aid in determining the scope of the claimed subject matter.

SUMMARY

A mobile work machine includes a propulsion subsystem that propel the mobile work machine about a worksite. The mobile work machine includes a steering subsystem that steers the mobile work machine about the worksite. The mobile work machine includes a stability determination system that determines a stability factor based on a characteristic of the steering subsystem. The mobile work machine also includes a control system that controls the mobile work machine based on the stability factor.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Agricultural tractors and similar machines allow for various attachments to be coupled to the machine for a wider variety of functions. Some attachments include a front loader, a backhoe, a scraper, a mulcher, etc. When these attachments are coupled to the machine they can disrupt the stability of the machine in different situations. For example, a loader in a raised position carrying a heavy load increases the center of gravity of the machine and can increase the risk of a lateral tip hazard. Ballasts can be added to the machine which, amongst other functions, lower or otherwise change the center of gravity. A system can be provided to calculate the center of gravity and/or stability characteristics of the machine and its ballasts/attachments to prevent lateral tipping of the machine as it completes turns.

Figure 1:
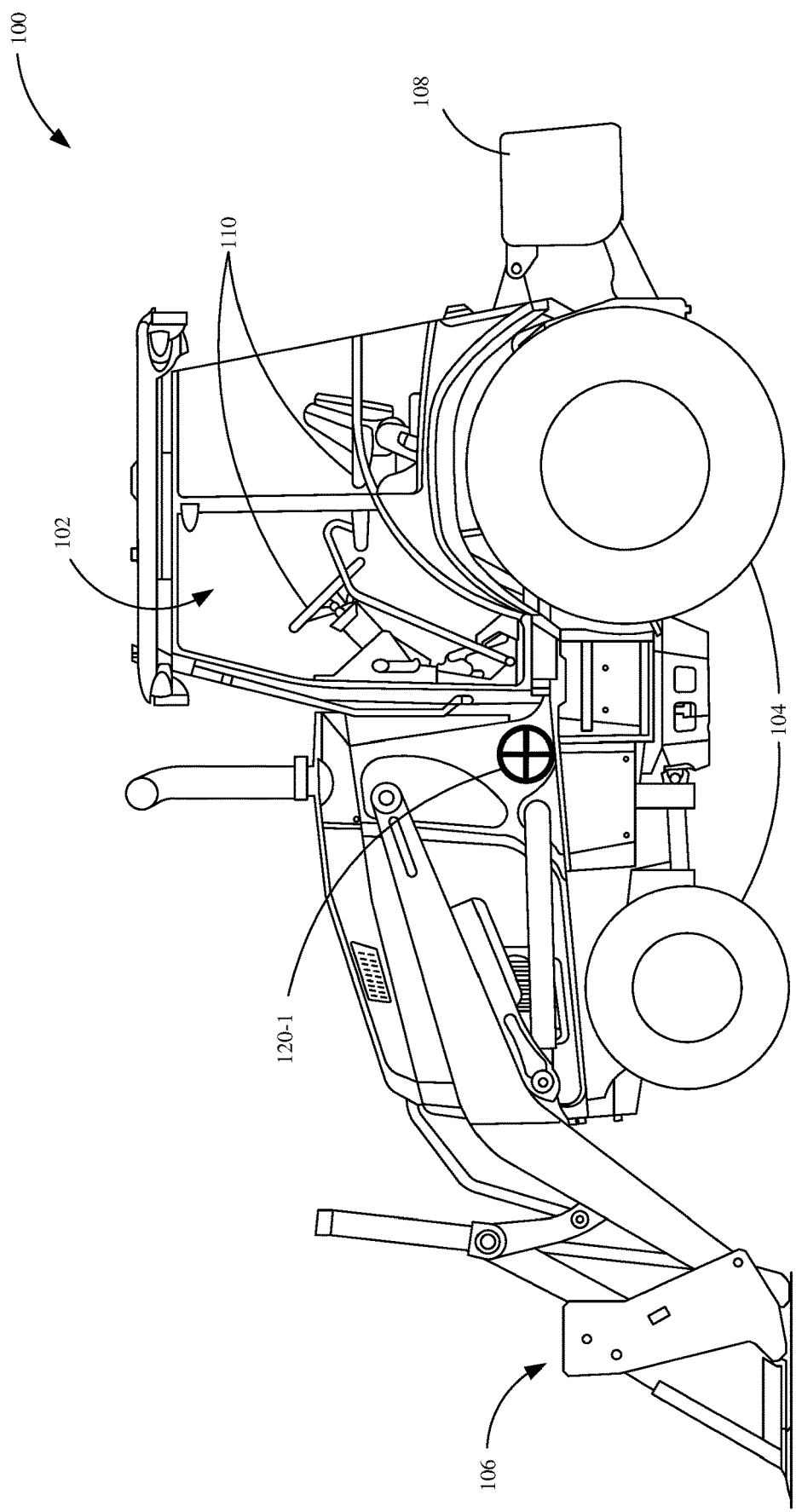
FIG. 1 is a side view showing an example machine.

FIG. 1 is a side view showing an example machine 100. Machine 100 includes an operator compartment 102, wheels 104, loader 106 and an attachment or ballast 108. Operator compartment 102 includes various user interface devices 110 that a user that operator uses to control machine 100. Some examples of user interface devices 110 include steering wheels, pedals, displays, touchscreens, levers, etc. Wheels 104 engage a ground of the work environment and propel and steer machine 100. In other examples, wheels 104 could be replaced with other ground engaging elements as well, such as tracks. Loader 106 is a front loader coupled to machine 100 that allows machine 100 to move loads about a worksite. Loader 106 can perform other functions as well such as grading, leveling, etc. As shown loader 106 is in a lowered position and does not contain a large load.

Machine 100 includes ballasts 108 or another attachment. Attachment/ballast 108 will be referred to as a ballast here forward, however, different types of attachments could provide the function a ballast typically fulfills. Ballasts are added mass that allow for better traction, steering, weight distribution and other benefits for machine 100. As shown, ballasts 108 are in the rear of machine 100, however, in other examples, ballast 108 may be within wheels 104, in the front of machine 100, on the underside of machine 100 or in other places as well. The location of ballasts 108 have an effect on the center of gravity of machine 100. Machine 100 has a center of gravity 120-1 in its current state. As we seen center of gravity 120-1 is at a relatively central and low position on machine 100.

Figure 2:
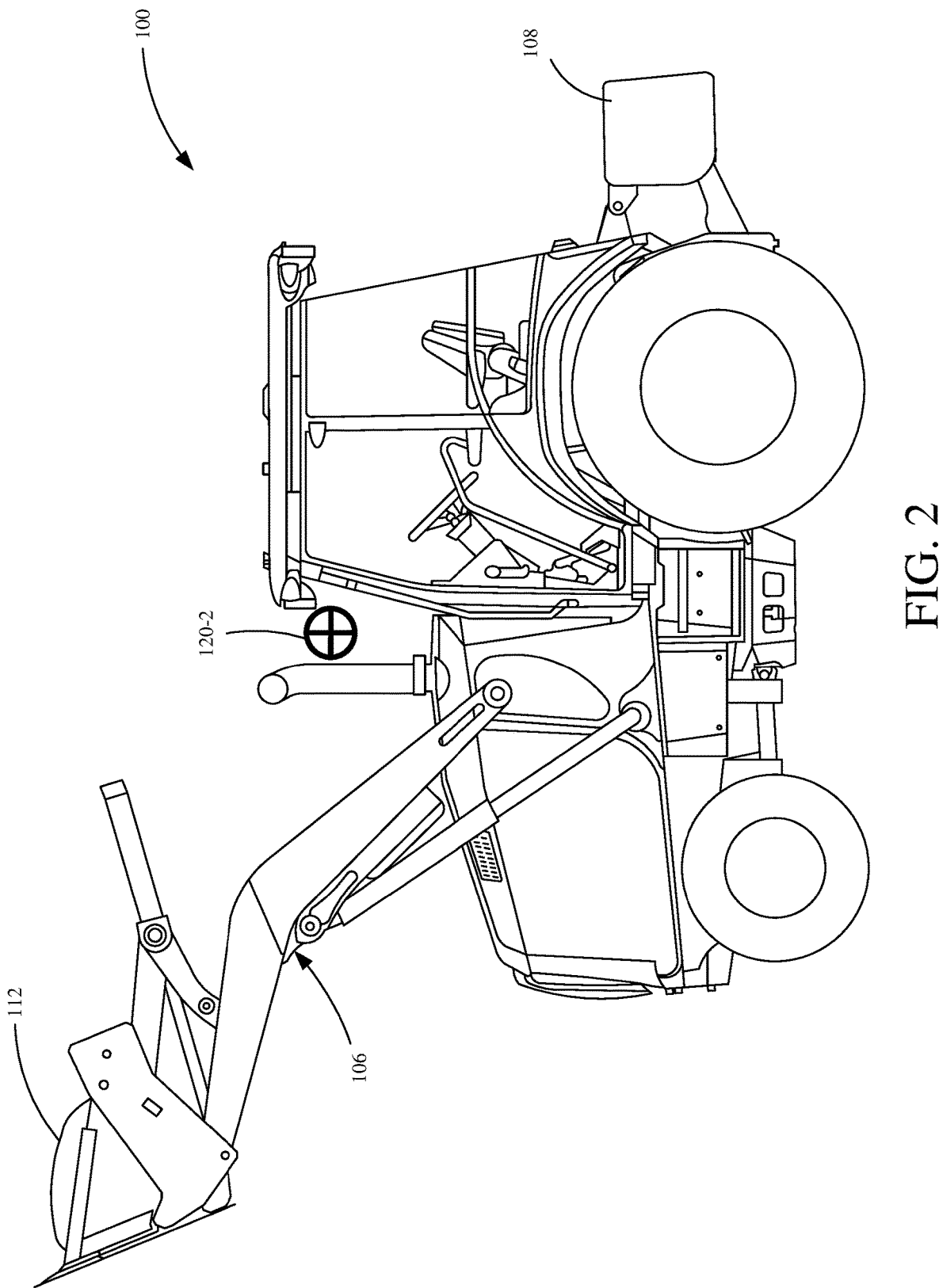
FIG. 2 is a side view showing the example machine in a loader raised position.

FIG. 2 is a side view showing the example machine 100. As can be seen in FIG. 2, loader 106 has been raised to a high position and also contains a load 112. Because of this, the center of gravity 120-2 has risen to a higher point relative to machine 100. In this state, machine 100 is more susceptible to tipping or rolling since the center of gravity is higher. In some examples, more ballast 108 can be used to lower the center of gravity despite a load 112 being in loader 106. However, increasing the ballast 108 too much can affect the performance of machine 100 (e.g., fuel consumption, sinking into ground, etc.). Increasing ballast 108 can also be subject to maximum permissible loads of the axles or the overall machine 100.

Figure 3:
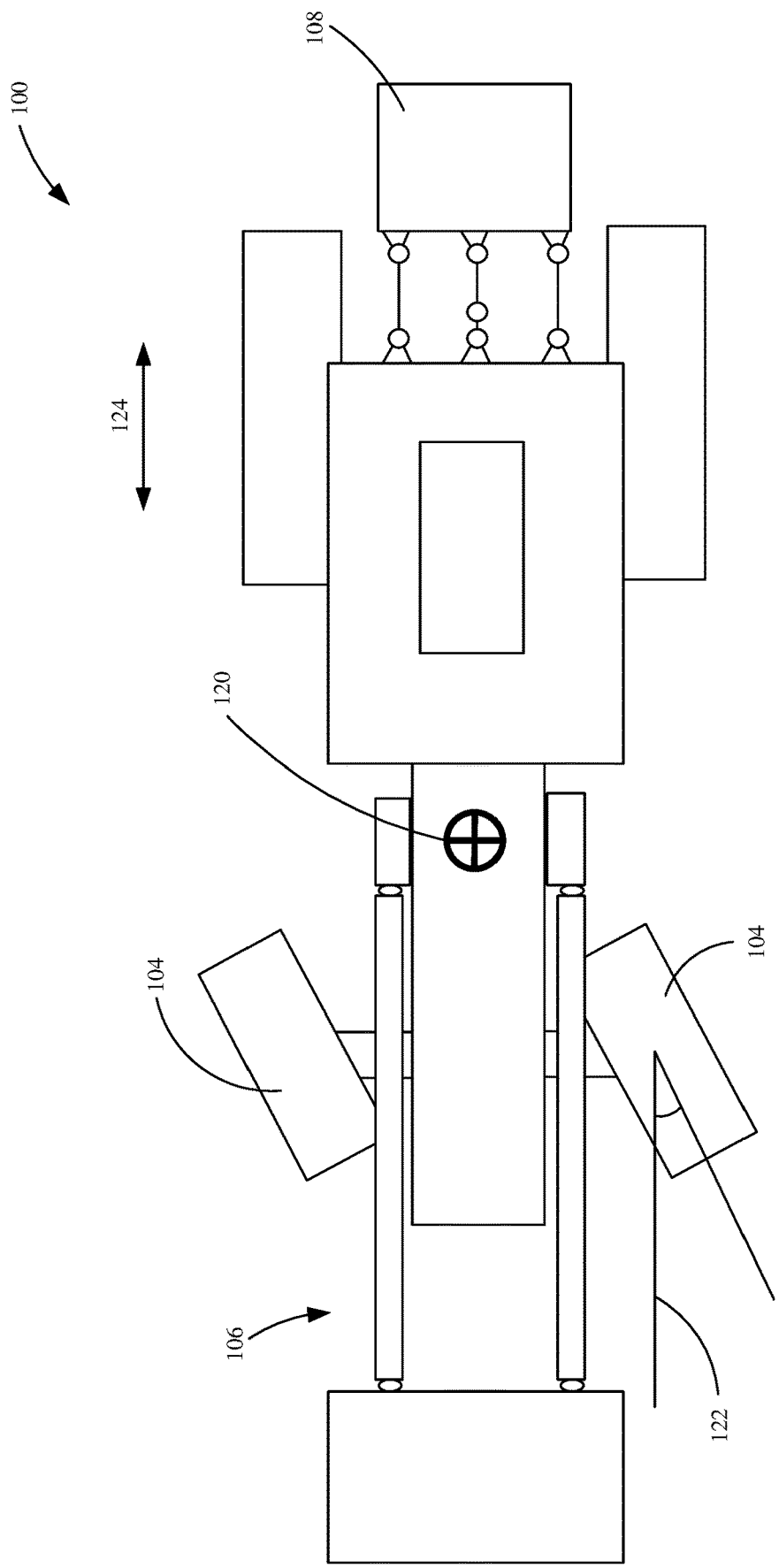
FIG. 3 is a top view showing the example machine in a turning position.

FIG. 3 is a top view showing the example machine 100. In this view the center of gravity 120 is shown centrally located on machine 100. In this view, the wheel angle 122 of front wheels 104 can be seen. Wheel angle 122 is proportional to the turn radius or curve travel radius of machine 100 as it moves forwards or backwards. In some instances, the turn radius or curve travel radius of machine 100 can be disproportionate to wheel angle 122. For instance, when angled wheels 104 have slippage across a surface. A sensor can be disposed proximate wheels 104 such that the curve travel radius is detected. Some examples of sensors include a potentiometer, a linear displacement transducer, an "in rubber" sensor, a gyroscope, a compass, a camera, etc. Some of these sensors can also detect slippage, for instance, a video from camera can be analyzed to determine if the excepted turn radius corresponds to the movement of the non-machine components relative to the machine components in the video.

As machine 100 travels at a faster speed in the direction indicated by arrow 124 the less wheel angle 122 may be to prevent tipping of machine 100. Similarly, the greater wheel angle 122 is, the slower machine 100 must go to prevent tipping of machine 100.

Figure 4:
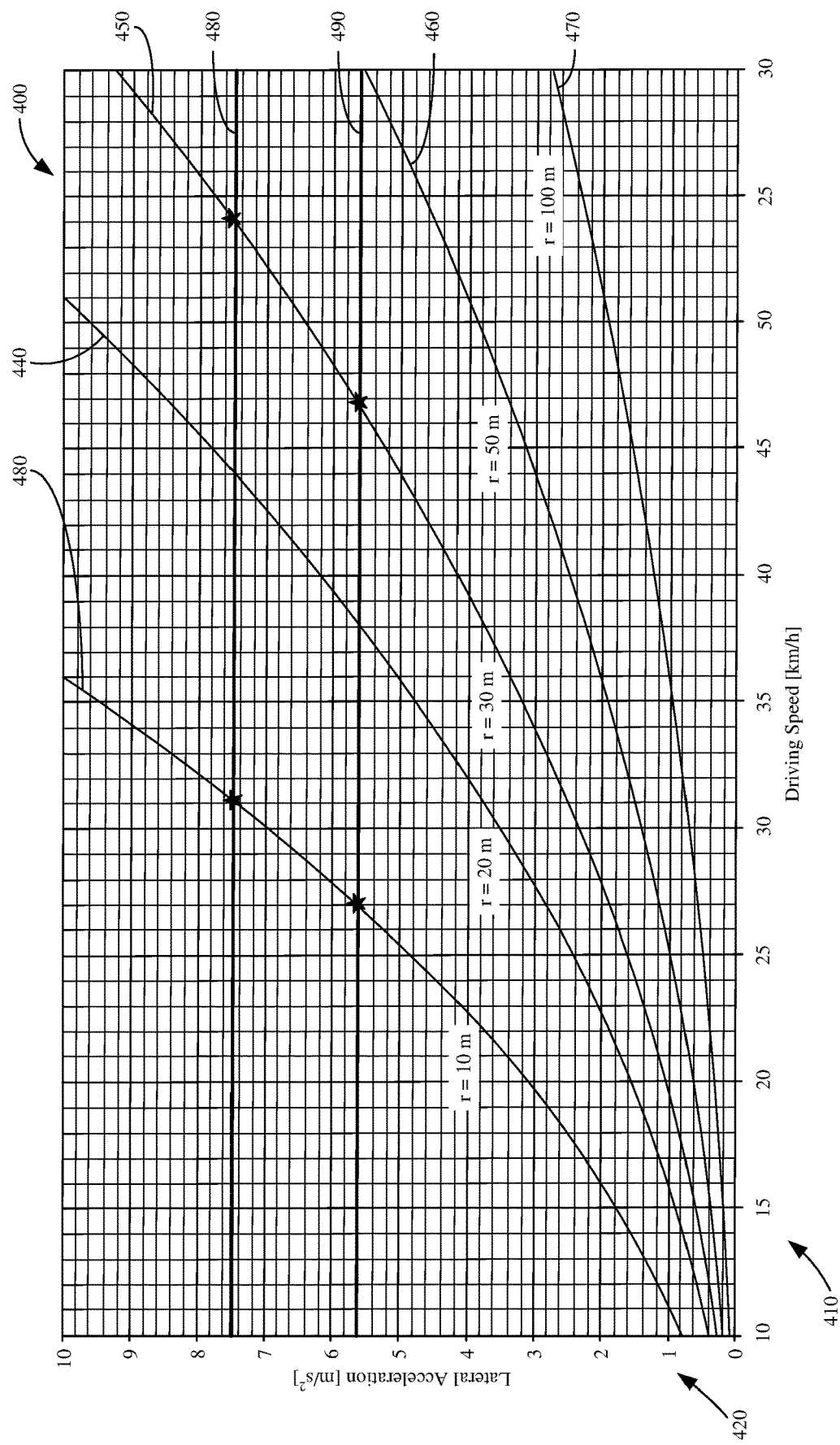
FIG. 4 is a diagrammatic view showing an example stability chart.

FIG. 4 is an example chart plotting a turn radius (e.g., curve radius) with a driving speed of machine 100. X-axis 410 represents driving speed in kilometers per hour. Y-axis 420 represents lateral acceleration in meters per second squared. Lateral acceleration is relevant to the lateral tipping of machine 100.

Line 430 represents the characteristics of machine 100 as it passes through a 10 m radius curve. Line 440 represents the characteristics of machine 100 as it passes through a 20 m radius curve. Line 450 represents the characteristics of machine 100 as it passes through a 30 m radius curve. Line 460 represents the characteristics of machine 100 as it passes through a 50 m radius curve. Line 470 represents the characteristics of machine 100 as it passes through a 100 m radius curve. These lines show a clear trend that the larger the curve radius (smaller the front wheel turn angle) the less lateral acceleration machine 100 will undergo.

Line 480 represents a maximum lateral acceleration machine 100 can undergo when loader 106 empty and low without tipping. Line 490 represents the maximum lateral acceleration machine 100 can undergo when loader 106 has a load in it and is raised to a given level. The points where lines 430, 440, 450 and 460 intersect with lines 480 and 490 represent the tipping points of machine 100 given their curve radius/driving speed combination characteristics.

Figure 5:
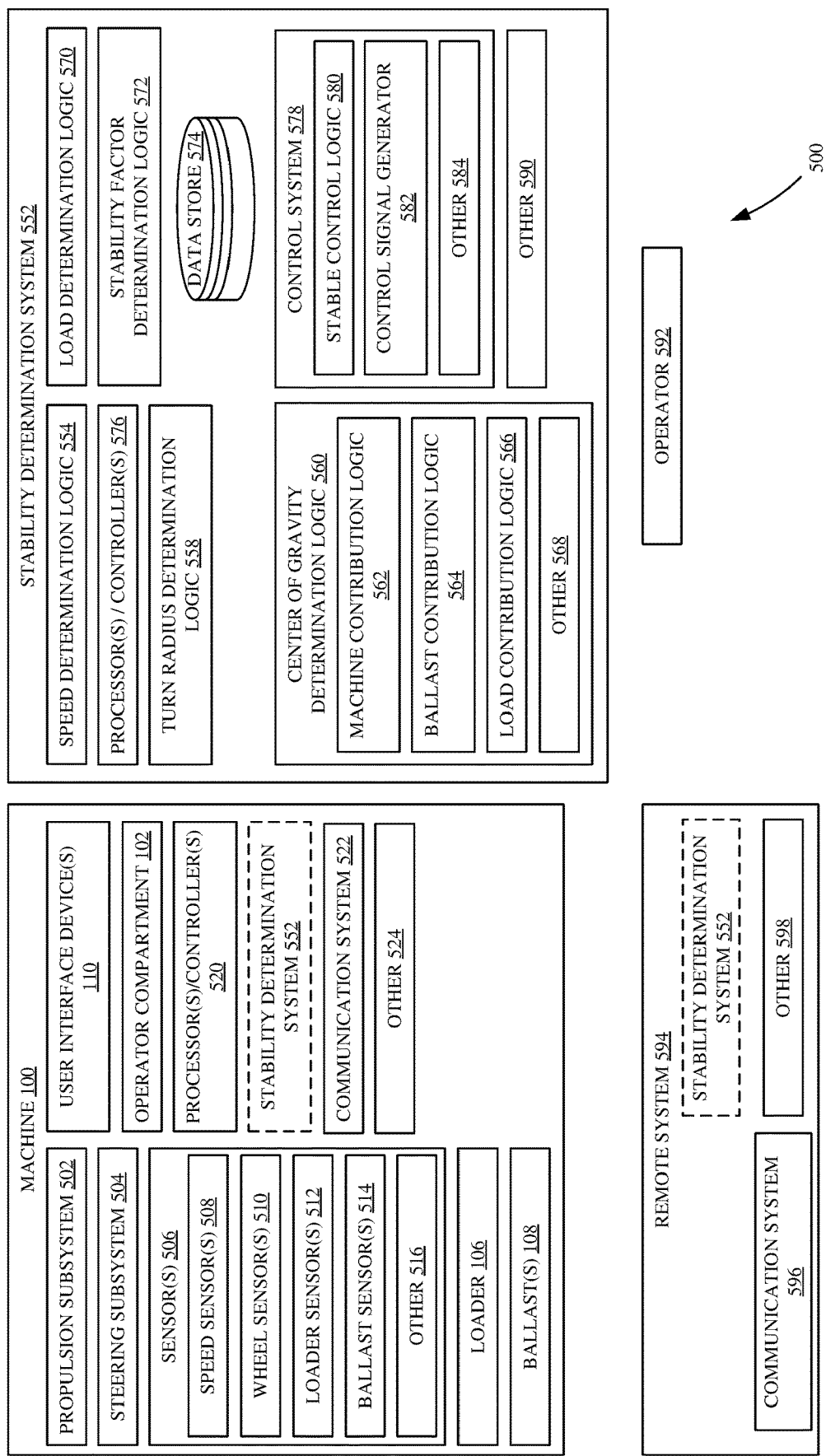
FIG. 5 is a block diagram showing an example operating environment.

FIG. 5 is a block diagram showing machine 100 in an environment 500. FIG. 5 includes machine 100, stability determination system 552, remote system 594 and operator 592. Some of these components have previously been described above. Some of these components can be located at different positions than shown.

Machine 100 includes propulsion subsystem 502, steering subsystem 504, sensors 506, ballasts 108, user interface devices 110, operator compartment 102, processors/controllers 520, communication system 522 and can include other items as well as indicated by block 524. For example, stability determination system 552 can be part of machine 100.

Propulsion subsystem 502 propels machine 100 about an environment. For instance, propulsion subsystem 502 includes an engine, transmission, differential, wheels 104, etc. The engine generates power that is transferred to the ground through the other components of the power train to propel machine 100. Steering subsystem 504 steers machine 100 about the environment. For instance, steering subsystem 504 includes wheels 104 that can be angled relative to a frame of machine 100, as wheels 104 are angled, machine 100 follows a curved path. Steering subsystem 504, could include multiple wheels 104 that are angled, for instance, an articulating steering system.

Sensors 506 sense various characteristics of machine 100. Sensors 506 include speed sensors 508, wheel sensors 510, loader sensors 512, ballast sensors 514 and can include other items as well, as indicated by block 516. Speed sensors 508 can determine or sense the speed of machine 100. For example, a speed sensor can include a speedometer coupled to a portion of propulsion subsystem 502 that determines speed based on the rotation of wheels 104. Or for example, a speed sensor can include a sensor coupled to the rear wheels 104 that is indicative of rotations over time. In this case, the speed would be proportional to the wheel size (minus any slippage). In another example, speed sensor 508 includes a camera or range scanning device.

Wheel sensors 510 can include sensors that indicate the wheel angle 122 of front wheels 104. Or, for example, wheel sensors 510 include sensors that determine the current curve radius that machine 100 is traveling on regardless of steering wheels, articulating wheels, tracks, etc. For instance, a camera or ranging scanning device could be used to determine the travel curve radius. In some examples, a wheel sensor 510 could be inside wheel 104.

Loader sensors 512 sense a characteristic of loader 106 and/or load 112 in loader 106 of machine 100. Loader sensors 512 can include cameras, hydraulic gauges, force meters, potentiometers, linear displacement transducers, or other sensors that can sense a characteristic of loader 106 and/or load 112. Some characteristics that loader sensor 512 can sense include the weight or mass and location of load 112 in loader 106 and the height and/or orientation of loader 106 relative to the machine 100. The weight or mass of load 112 can be sensed with a force meter and the location/distribution of load 112 in loader 106 can be sensed with a camera. The height of loader 106 can be sensed with a linear displacement transducer on the actuating hydraulic cylinder that actuates loader 106 or angular potentiometers in the pivot points of the loader kinematic.

Ballast sensors 514 include sensors that sense a characteristic of a ballast 108. For instance, ballast sensors 514 can include a mass or weight sensor that senses the weight of the ballast 108. Since ballasts 108 are typically coupled to the machine 100 at standardized positions, ballast sensors 514 can also be indicative of the location of the ballast on machine 100. Sensors 506 can include other types sensors as well, as indicated by block 516. For instance, ballast sensors 514 include sensors that can sense the type of ballast or attachment (e.g., model number, etc.) and the mass, geometry data can be retrieved based on the type of ballast or attachment.

Processors/controllers 520 are configured to control machine 100 and implement logic components of machine 100. Processors/controllers 576 can include microprocessors, application-specific integrated circuits, computers, servers, computing devices or other devices that allow for processing of electronic or mechanical signals. Communication system 522 allows machine 100 to communicate with other with components external to machine 100. For example, communication system 522 can communicate over Bluetooth, Wi-Fi, near field communication, wide area networks, local area networks, or other communication protocols.

Stability determination system 552 includes speed determination logic 554, center of gravity determination logic 560, turn radius determination logic 558, center of gravity determination logic 560, load determination logic 570, stability factor determination logic 572, control system 578, processors/controllers 576, data store 574 and can include other items as well, as indicated by block 590.

Speed determination logic 554 receives sensor signals from speed sensors 508 and determines a speed of machine 100. In some examples speed determination logic 554 accounts for factors such as tire slippage when calculating the speed of machine 100.

Turn radius determination logic 558 receives sensor signals from wheel sensors 510 and determines they travel curve radius of machine 100. For example, turn radius determination logic 558 receives wheel sensor signals from wheel sensors 510 indicative of the angle of the wheel relative to a frame of machine 100. This angle with other machine geometry knowledge can be used to determine the curve travel radius of machine 100. In some examples, turn radius determination logic 558 can account for factors such as slippage of tires when calculating the curve travel radius of machine 100.

Center of gravity determination logic 560 determines the center of gravity of machine 100. Center of gravity determination logic 560 includes machine contribution logic 562, ballast contribution logic 564, load contribution logic 566 and can include other items as well, as indicated by block 568. Machine contribution logic 562 determines the contribution of the weight of the standard components of machine 100 (e.g., the frame, power train, operator compartment, etc.) to the center of gravity. A stock machine 100 can have a known center of gravity based on the factory design of machine 100. In some examples, machine contribution logic 562 also determines contributions of attachments to the center of gravity (e.g., backhoe, front loader, grader, etc.).

Ballast contribution logic 564 determines the contribution one or more ballast 108 to the center of gravity. For example, operator 592 can enter the amount of added ballast 108 and their location through a user interface device 110 and this information is used to determine the contribution of ballast 108 to the center of gravity of machine 100. In another example, ballast contribution logic 564 receives ballast sensor signals from ballast sensors 514 and determines the contribution of ballast to the center of gravity based on the sensor signals. Load contribution logic 566 determines the contribution of a load in loader 106 to the center of gravity of machine 100. For example, load contribution logic 566 receives information on the raised height of loader 106 and the amount the weight and location of a load in loader 106 and uses this information to determine the load contribution to the center of gravity machine 100. Center of gravity determination logic 560 can also include contributions from other factors as well. For instance, the size of wheels 104 can be a factor in the center of gravity of machine 100.

Load determination logic 570 determines characteristics of a load in loader 106. For example, load determination logic 570 receives sensor signals from loader sensors 512 and determines the mass and position of load 112 in loader 106. In one example, load determination logic 570 receives a sensor from a hydraulic cylinder that supports and actuates loader 106 and determines the weight of the load based on the sensor signal. Also, load determination logic 570 can receive an image from a camera to identify the location of load 112 in the loader 106. The weight and location of the load can be used to accurately determine the center of gravity contribution of the load (and loader) to the center of gravity of machine 100.

Stability factor determination logic 572 determines a stability factor of machine 100. A stability factor is a metric indicative of the stability of machine 100 and its likelihood to tip. Stability factor determination logic 572 can receive a speed from speed determination logic 554, a curve radius from turn radius determination logic 558 and a center of gravity from center of gravity determination logic 560 to determine the stability factor of machine 100. As illustrated in FIG. 4 as a larger load is raised higher on machine 100 the stability factor decreases. Also as indicated by FIG. 4 as the speed of machine 100 increases, the stability factor decreases. Also illustrated in FIG. 4, as the turn radius decreases, the stability factor decreases. In some examples, stability factor determination logic 572 references a lookup chart of that includes combinations of these values and the stability factor that they output. In other examples, stability factor determination logic 572 utilizes an algorithm with these factors as inputs and a stability factor as an output. Of course, stability factor determination logic 572 can determine the stability factor in other ways as well.

Data store 574 stores varies information used by stability determination system 552 in controlling the machine 100. For example, data store 574 can include machine geometry and mass information that machine contribution logic 562 utilizes to determine the machine contribution to the center of gravity of machine 100. For example, data store 574 includes the lookup tables used by stability factor determination logic 572 to determine the stability factor of machine 100 based on the current operational characteristics of machine 100. Of course, data store 574 can include other items as well. Processors/controllers 576 can implement the logic components of stability determination system 552. Processors/controllers 576 can include processors, application-specific integrated circuits, computers, servers, computing devices or other devices that allow for processing of signals.

Control system 578 controls machine 100 based on a stability factor determined by stability factor determination logic 572. Control system 578 include stable control logic 580, control signal generator 582 and can include other items as well as indicated by block 584. Stable control logic 580 determines a control action that will control of machine 100 in a stable manner. That is, a manner that avoids a stability hazard of machine 100, such as lateral tipping. In one example, stable control logic 580 decreases the speed of machine 100 such that the stability factor decreases to a point that machine 100 does not tip. Another example, stable control logic 580 alerts operator 592 of the stability hazard. For example, stable control logic 580 can send an audible, a visual or a haptic alert to operator 592. For instance, stable control logic 580 can apply a restrictive force on a steering wheel that operator 592 is using to turn machine 100. In some examples this force can be overcome by operator 592 such that the turn travel curve radius of machine 100 is maintained. In other examples, the resisting force forces machine 100 to alter its current curve travel radius.

Control signal generator 582 generates control signals that are sent to actuators machine 100 to implement the control actions determined by stable control logic 580. For instance, control signal generator 582 generates control signals that are sent a propulsion subsystem 502 to decrease the speed of machine 100.

Remote system 594 includes communication system 596 and optionally includes stability determination system 552. Remote system 594 can include other items as well as indicated by block 598. Communications Systems 596 can communicate with machine 100 and other systems as well through the protocols previously listed.

Figure 6:
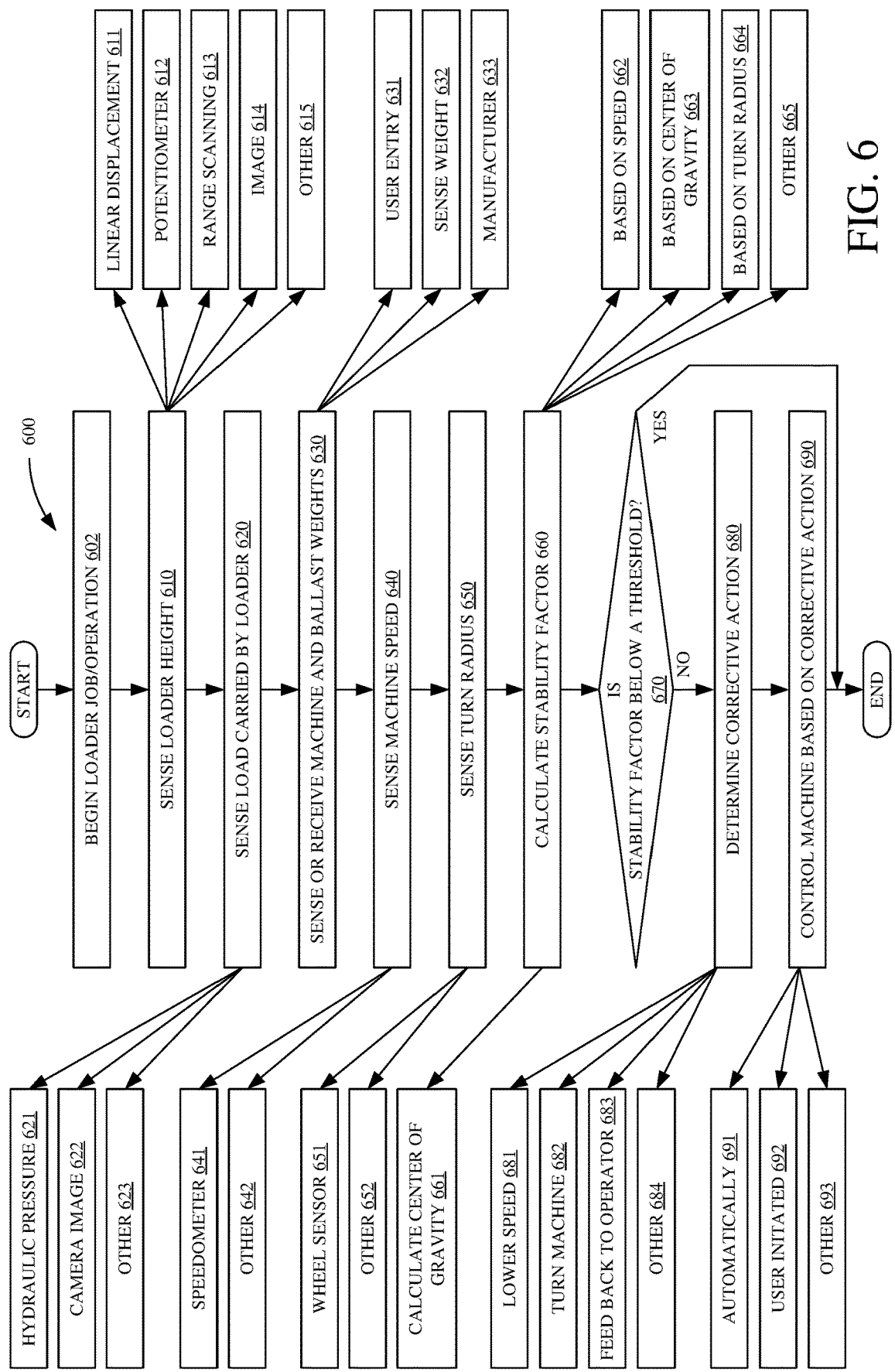
FIG. 6 is a flow diagram showing an example machine operation.

FIG. 6 is a flow diagram showing an example operation 600 of machine 100. Operation 600 begins at block 602 where the loader begins a job. For instance, the loader begins moving loads from one pile to another at an agricultural worksite.

Operation 600 proceeds at block 610 where the loader height and/or orientation is sensed. As indicated by block 611, a linear displacement transducer on a hydraulic cylinder that actuates loader 106 can be used to determine the loader height and/or orientation. As indicated by block 612, a potentiometer near or on loader 106 can be indicative of the loader height and/or orientation. As indicated by block 613, a range scanning device can be used to sense the height and/or orientation of loader 106. For instance, a LIDAR array can be used to sense the orientation and height of loader 106. As indicated by block 614, an image of loader 106 can be used to determine the height and/or orientation of loader 106. Of course, as indicated by block 615, the loader height and/or orientation can be sensed in other ways as well.

Operation 600 proceeds at block 620 where the load carried by the loader is sensed. As indicated by block 621, the mass of the load can be sensed via hydraulic pressure in an actuating hydraulic cylinder that supports loader 106. The pressure will increase as the mass within the loader increases. As indicated by block 622, a camera image taken of the load in loader can be used to estimate the weight of the load in the loader. Of course, the load carried by loader can be sensed other ways as well, as indicated by block 623. For instance, a range scanning device can be used to sense the volume of the load and the mass of the load can be estimated based on the volume.

Operation 600 proceeds at block 630 where the machine and ballast weights are sensed or received. As indicated by block 631, a user can enter the machine and/or ballast information. For instance, a user interface may be displayed that a user can interact with to enter the model numbers or identification numbers of the machine and/or ballast. As indicated by block 632, the weight or other characteristics of the machine ballast can be sensed. For instance, the machine can be placed on a scale. Or for instance, identifying tags on the machine and/or ballast can be sensed (e.g., identifying RFID tags that include mass and geometry information). Or, for instance, ballasts can be coupled to machine 100 through a weight sensor such that their weight can be sensed when they are coupled to machine 100 (e.g., a hitch draft sensor). As indicated by block 633, the information can be provided by a manufacturer or come preloaded on a data store 574. As indicated by block 634, the machine and ballast mass and geometry information can be sensed or received in other ways as well.

Operation 600 proceeds at block 640 where the machine speed is sensed. As indicated by block 641, a speedometer can be used to sense the speed of the machine. As indicated by block 642, the speed can be determined in other ways as well. For instance, a camera approximate machine can be used to determine the speed of machine 100.

Operation 600 proceeds at block 650 where the turn radius of the machine is sensed. As indicated by block 651, a wheel sensor proximate one or more wheels can be used to determine the angle of a wheel relative to the frame of the machine. This angle is indicative of an intended turn radius of the machine. The turn radius can be sensed in other ways as well, as indicated by block 652. For instance, a camera, compass, accelerometer or gyroscope can be used to determine the turn radius.

Operation 600 proceeds at block 660 where a stability factor is calculated. As indicated by block 661, the stability factor can include calculating a center of gravity of the machine. For instance, a center of gravity is calculated based on the loader height, load/loader characteristics (e.g. mass, location etc.), machine and ballast mass and geometric characteristics, etc.

As indicated by block 662, the stability factor can be based on the speed of machine 100. As indicated by block 663, the stability factor can be based on the center of gravity of the machine. As indicated by block 664, the stability factor can be based on the turn radius of machine 100. As indicated by block 665, the stability factor can be based on other factors as well. For instance, the stability factor can be based on the ground roughness or slope and direction of the ground, wheel diameter size, wheel width, track width, etc.

Operation 600 proceeds at block 670 where it is determined if the stability factor is below a threshold level. If the stability factor is below a threshold level, then machine 100 continues as normal (controlled by the operator) and operation 600 ends. If the stability factor is above a threshold then operation 600 proceeds at block 680.

At block 680, a corrective action is determined. As indicated by block 681, a corrective action can include lowering the speed of the machine. Lowering the speed without changing the turn radius of the machine allows a user to keep on the same path that they are intending. This option would prevent an operator from deviating into an object they are trying to avoid by steering. As indicated by block 682, a corrective action can include turning the machine (e.g., reducing the turn radius of the machine). This action may or may not be chosen based on the presence of an object in an estimated new path. For example, the machine may be straightened out only if an object is not in the new strain path. As indicated by block 683, feedback may be given to the operator that they are on an unstable path at their given speed. In one example is feedback includes applying a restrictive force on the steering wheel such that the tractor begins to straighten but an operator can resist against the straightening, restrictive force. As indicated by block 684, a corrective action can include other things as well. For instance, a corrective action can include lowering the carried load such that the tip hazard is reduced.

Operation 600 proceeds of block 690 where the machine is controlled based on the corrective action. As indicated by block 691, the corrective action may be taken automatically. As indicated by block 692, the corrective action may be suggested to the user and the user must accept the suggestion to initiate the corrective action. As indicated by block 693, the corrective action can be taken in other ways as well. For instance, the action may automatically be taken unless the user vetoes the action within a given amount of time. After the corrective action is taken, operation 600 and can be repeated.

The present discussion has mentioned processors and servers. In one example, the processors and servers include computer processors with associated memory and timing circuitry, not separately shown. They are functional parts of the systems or devices to which they belong and are activated by and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores.

All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

Figure 7:
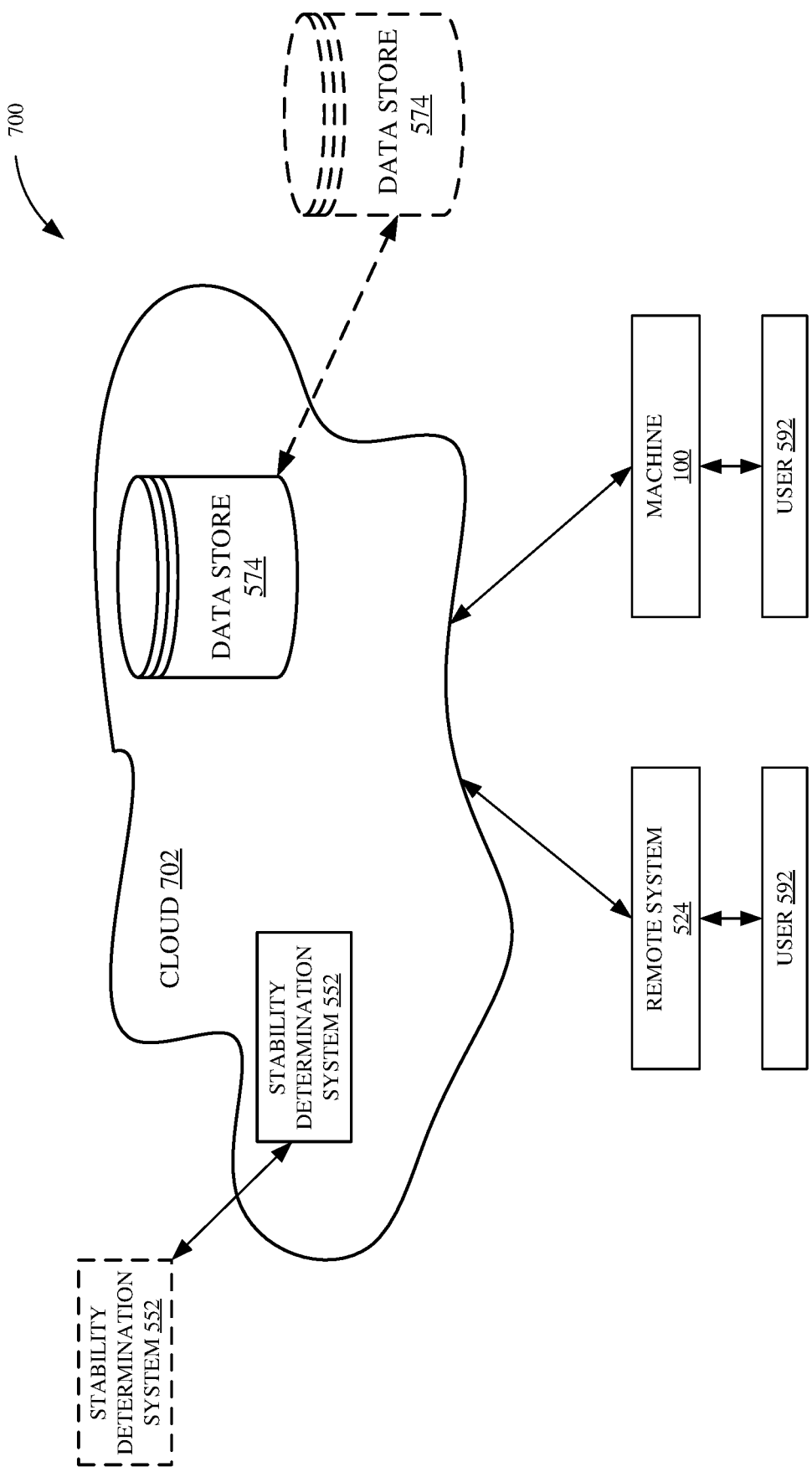
FIG. 7 is block diagram showing the environment of FIG. 5 in a cloud environment.

FIG. 7 is a block diagram of machine 100, shown in FIG. 5, except that it communicates with elements in a remote server architecture 700. In one example, remote server architecture 700 can provide computation, software, data access, and storage services that do not require end-user knowledge of the physical location or configuration of the system that delivers the services. In various examples, remote servers can deliver the services over a wide area network, such as the internet, using appropriate protocols. For instance, remote servers can deliver applications over a wide area network and they can be accessed through a web browser or any other computing component. Software or components shown in FIG. 5 as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, they can be provided from a conventional server, or they can be installed on client devices directly, or in other ways.

In the example shown in FIG. 7, some items are similar to those shown in FIG. 5 and they are similarly numbered. FIG. 7 specifically shows that stability determination system 552 and data store 574 can be located at a remote server location 702. Therefore, machine 100 accesses those systems through remote server location 702.

FIG. 7 also depicts another example of a remote server architecture. FIG. 7 shows that it is also contemplated that some elements of FIG. 5 are disposed at remote server location 702 while others are not. By way of example, data store 574 or interface system 552 can be disposed at a location separate from location 702, and accessed through the remote server at location 702. Regardless of where they are located, they can be accessed directly by machine 100, through a network (either a wide area network or a local area network), they can be hosted at a remote site by a service, or they can be provided as a service, or accessed by a connection service that resides in a remote location. Also, the data can be stored in substantially any location and intermittently accessed by, or forwarded to, interested parties. For instance, physical carriers can be used instead of, or in addition to, electromagnetic wave carriers. In such an example, where cell coverage is poor or nonexistent, another mobile machine (such as a fuel truck) can have an automated information collection system. As mobile machine 100 comes close to the fuel truck for fueling, the system automatically collects the information from the harvester using any type of ad-hoc wireless connection. The collected information can then be forwarded to the main network as the fuel truck reaches a location where there is cellular coverage (or other wireless coverage). For instance, the fuel truck may enter a covered location when traveling to fuel other machines or when at a main fuel storage location. All of these architectures are contemplated herein. Further, the information can be stored on the mobile machine until the mobile machine enters a covered location. The mobile machine, itself, can then send the information to the main network.

It will also be noted that the elements of FIG. 5, or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 8:
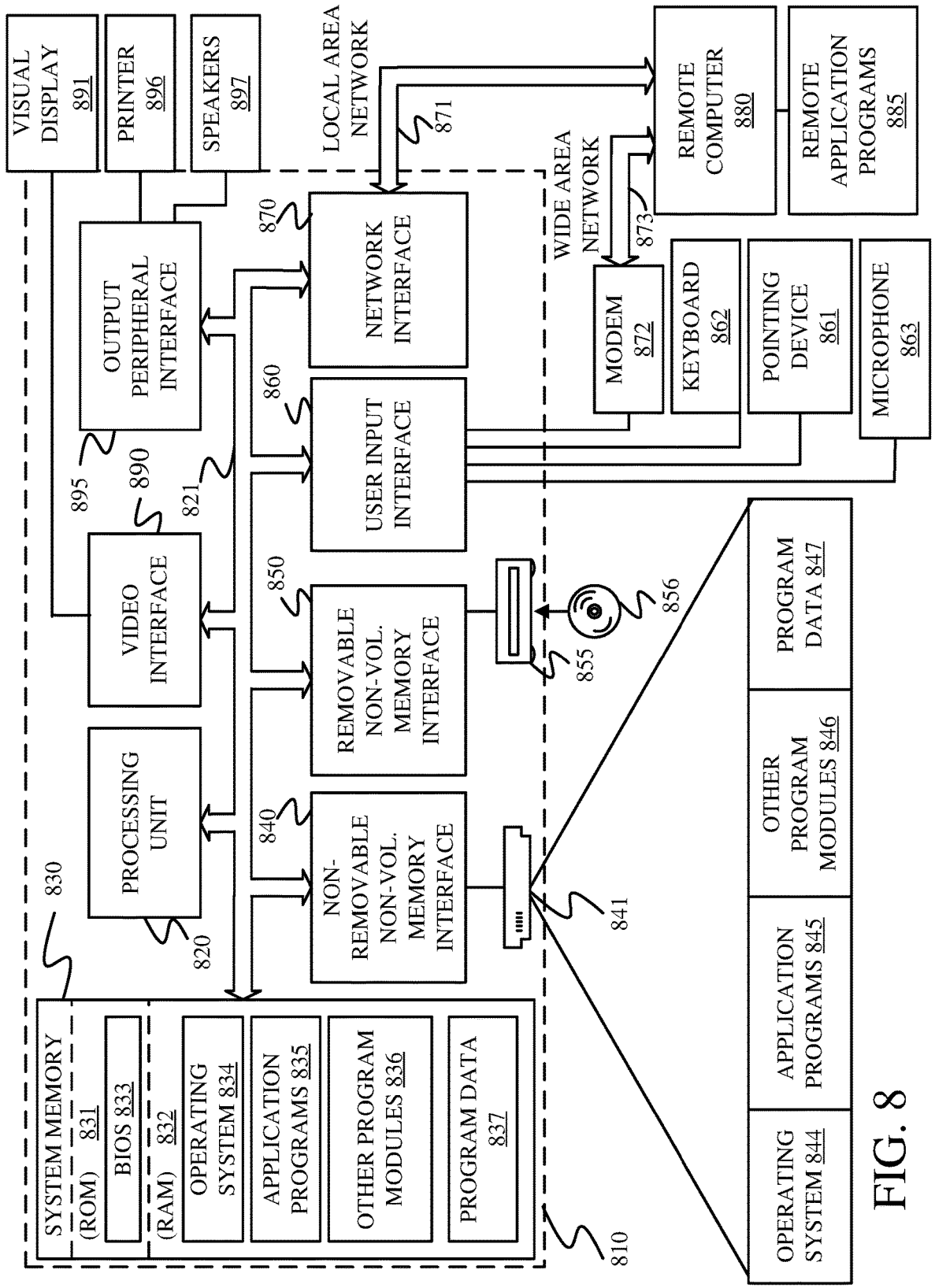
FIG. 8 is a block diagram showing an example computing system.

FIG. 8 is one example of a computing environment in which elements of previous FIGS., or parts of it, (for example) can be deployed. With reference to FIG. 8, an exemplary system for implementing some embodiments includes a computing device in the form of a computer 810 programmed to operate as discussed above. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to previous FIGS. can be deployed in corresponding portions of FIG. 8.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 8 illustrates operating system 834, application programs 835, other program modules 836, and program data 837.

The computer 810 may also include other removable/non-removable volatile/nonvolatile computer storage media. By way of example only, FIG. 7 illustrates a hard disk drive 841 that reads from or writes to non-removable, nonvolatile magnetic media, an optical disk drive 855, and nonvolatile optical disk 856. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 8, provide storage of computer readable instructions, data structures, program modules and other data for the computer 810. In FIG. 8, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a controller area network—CAN, local area network—LAN, or wide area network WAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 7 illustrates, for example, that remote application programs 885 can reside on remote computer 880.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

It should also be noted that the different examples described herein can be combined in different ways. That is, parts of one or more examples can be combined with parts of one or more other examples. All of this is contemplated herein.

Example 1 is a mobile agricultural machine comprising:
a propulsion subsystem that propel the mobile agricultural machine about a worksite;
a steering subsystem that steers the mobile agricultural machine about the worksite;
a stability determination system that determines a stability factor based on a characteristic of the steering subsystem;
a control system that controls the mobile agricultural machine based on the stability factor.

Example 2 is the mobile agricultural machine of any or all previous examples, wherein the steering subsystem comprises a steering sensor which generates the characteristic of the steering subsystem as a turn radius signal that is indicative of a turn radius of the mobile machine and wherein the stability determination system determines the stability factor based on the turn radius signal.

Example 3 is the mobile agricultural machine of any or all previous examples, wherein the steering sensor senses a wheel angle relative to a frame of the mobile agricultural machine.

Example 4 is the mobile agricultural machine of any or all previous examples wherein the stability determination system comprises center of gravity determination logic that determines a center of gravity of the mobile agricultural machine and wherein the stability factor is determined based on the center of gravity.

Example 5 is the mobile agricultural machine of any or all previous examples wherein the center of gravity determination logic receives a ballast weight, a load weight, a ballast position, and a load position and determines the center of gravity based on the ballast weight, the load weight, the ballast position and the load position.

Example 6 is the mobile agricultural machine of any or all previous examples, wherein the propulsion subsystem comprises a speed sensor which generates a speed signal indicative of a speed of the mobile agricultural machine and wherein the stability determination system determines the stability factor based on the speed signal.

Example 7 is the mobile agricultural machine of any or all previous examples, wherein the control system controls the mobile agricultural machine based on a comparison of the stability factor with a threshold stability value.

Example 8 is the mobile agricultural machine of any or all previous examples, wherein the control system references a stability lookup table to control the mobile machine based on the stability factor.

Example 9 is the mobile agricultural machine of any or all previous examples, wherein the control system reduces a travel speed of the mobile agricultural machine based on the stability factor.

Example 10 is the mobile agricultural machine of any or all previous examples, wherein the control system controls the mobile agricultural machine to alert an operator of a stability hazard.

Example 11 is the mobile agricultural machine of any or all previous examples, wherein the control system controls the mobile agricultural machine to apply a restrictive force on a user interface mechanism to alert the operator of the stability hazard.

Example 12 is a computer implemented method of controlling a mobile machine, the method comprising:
  determining a center of gravity of the mobile machine;
  determining a travel speed of the mobile machine;
  determining a turn radius of the mobile machine;
  determining a stability factor of the mobile machine based on the travel speed, center of gravity and the turn radius of the mobile machine;
  controlling a subsystem of the mobile machine based on the stability factor.

Example 13 is the computer implemented method of any or all previous examples wherein determining the center of gravity comprises:
  receiving a load sensor signal from a load sensor;
  determining a load mass based on the load sensor signal; and
  wherein determining the center of gravity is based on the load mass.

Example 14 is the computer implemented method of any or all previous examples wherein the load sensor comprises a hydraulic pressure gauge and the load sensor signal is indicative of a hydraulic pressure of one or more hydraulic cylinders that support at least a portion of the load mass.

Example 15 is the computer implemented method of any or all previous examples wherein determining the center of gravity comprises: receiving a load position sensor signal from a load position sensor; determining a load position based on the load position sensor signal; and wherein determining the center of gravity is based on the load position.

Example 16 is the computer implemented method of any or all previous examples wherein determining the turn radius of the mobile machine comprises:
  receiving a steering sensor signal from a steering subsystem sensor;
  determining a wheel angle based on the steering sensor signal; and
  wherein determining the turn radius of the mobile machine is based on the wheel angle.

Example 17 is the computer implemented method of any or all previous examples wherein controlling the subsystem of the mobile machine comprises:
  applying a resisting force on a user interface mechanism; or reducing the travel speed of the mobile machine such that the stability factor is reduced to a threshold stability factor.

Example 18 is a control system for a front loader equipped mobile machine, the control system comprising:
  speed determination logic that receives a speed sensor signal and generates a speed signal based on the speed sensor signal;
  center of gravity determination logic that receives determines a center of gravity of the mobile machine and generates a center of gravity signal;
  turn radius determination logic that receives a steering subsystem sensor signal and generates a turn radius signal based on the steering subsystem sensor signal; and
  stability factor determination logic that determines a stability factor based on the speed signal, the center of gravity signal and the turn radius signal; and
  control logic that controls the front loader equipped mobile machine based on the stability factor.

Example 19 is the control system of any or all previous examples wherein the center of gravity determination logic comprises:
  machine contribution logic that determines a machine contribution to the center of gravity;
  ballast contribution logic that determines a ballast contribution to the center of gravity;
  load determination logic that receives a load sensor signal and determines a load characteristic;
  load contribution logic that determines a load contribution to the center of gravity; and
  wherein the center of gravity determination logic determines the center of gravity based on the machine contribution, the ballast contribution and the load contribution.

Example 20 is the control system of any or all previous examples wherein the control logic controls the front loader equipped mobile machine by reducing a travel speed of the front loader equipped mobile machine.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. For example, the majority of the specification describes a tractor with a front loader, however, other examples could include a tractor with a different attachment or a skid steer with an attachment.

What is claimed is:
1. A mobile work machine comprising:
  a propulsion subsystem that propels the mobile agricultural machine about a worksite;
  a steering subsystem that steers the mobile agricultural machine about the worksite;
  a stability determination system that:
    references a lookup table that indicates, for each turn radius in a plurality of different turn radii, a minimum travel speed at which the mobile work machine will tip for each combination of a plurality of different combinations of load position and load weight; and
    determines a minimum travel speed at which the mobile work machine will tip by inputting a current turn radius of the mobile work machine, a current load position of a load carried by the mobile work machine, and a current weight of the load into the lookup table; and a control system that controls the mobile work machine to reduce a travel speed of the mobile work machine based on the determined minimum travel speed at which the mobile work machine will tip.

2. The mobile work machine of claim 1, wherein the steering subsystem comprises a steering sensor which generates a turn radius signal that is indicative of the current turn radius of the mobile work machine.

3. The mobile work machine of claim 2, wherein the steering sensor senses a wheel angle relative to a frame of the mobile work machine.

4. Mobile work machine of claim 2 wherein the stability determination system comprises load contribution logic that determines the current position of a load and the current weight of the load.

5. The mobile work machine of claim 1, wherein the propulsion subsystem comprises a speed sensor that generates a speed signal indicative of a current travel speed of the mobile work machine.

6. The mobile work machine of claim 5, wherein the control system controls the mobile work machine based on the current travel speed of the mobile work machine and the determined minimum travel speed at which the mobile work machine will tip.

7. The mobile work machine of claim 1, wherein the control system further controls the mobile work machine to alert an operator of a stability hazard.

8. The mobile work machine of claim 7, wherein the control system controls the mobile work machine to apply a restrictive force on a user interface mechanism to alert the operator of the stability hazard.

9. A computer implemented method of controlling a mobile machine, the method comprising:
determining a current turn radius of the mobile machine;
detecting, with a ballast sensor, a weight of a ballast;
detecting, with a load sensor, a weight of a load carried by the machine;
calculating a minimum speed at which the mobile machine will tip using the current turn radius, the weight of the ballast, and the weight of the load; and
controlling a travel speed of the mobile machine based on the calculated minimum speed
at which the mobile machine will tip.

10. The computer implemented method of claim 9 wherein the load sensor comprises a hydraulic pressure gauge and the load sensor signal is indicative of a hydraulic pressure of one or more hydraulic cylinders that support at least a portion of the weight of the load.

11. The computer implemented method of claim 9 and further comprising:
receiving a load position sensor signal from a load position sensor; and
determining a current load position of the load carried by the mobile machine based on the load position sensor signal.

12. The method of claim 11 and further comprising:
accessing a lookup table that indicates, for each turn radius in a plurality of turn radii, a minimum travel speed at which the mobile machine will tip for each combination of a plurality of different combinations of load position and load weight; and
wherein calculating the minimum speed at which the mobile machine will tip comprises calculating the minimum speed at which the mobile machine will tip using the current turn radius, the current weight of the load carried by the mobile machine, the current load position, and the lookup table.

13. The computer implemented method of claim 9 wherein determining the turn radius of the mobile machine comprises:
receiving a steering sensor signal from a steering subsystem sensor; and
determining a wheel angle based on the steering sensor signal; and
wherein determining the current turn radius of the mobile machine comprises determining the current turn radius of the mobile machine based on the wheel angle.

14. A control system for a front loader equipped mobile machine, the control system comprising:
speed determination logic that receives a speed sensor signal indicative of a current travel speed of the front loader equipped mobile machine and generates a speed signal, indicative of the current travel speed of the front loader equipped mobile machine, based on the speed sensor signal;
load contribution logic that receives one or more sensor signals from one or more load sensors and generates a load weight signal, indicative of a current weight of a load carried by the front loader equipped mobile machine, and a load position signal, indicative of a current position of the load carried by the front loader equipped mobile machine, based on the one or more sensor signals from the one or more load sensors;
turn radius determination logic that receives a steering subsystem sensor signal and generates a turn radius signal, indicative of a current turn radius of the front loader equipped mobile machine, based on the steering subsystem sensor signal;
stability factor determination logic that:
accesses a lookup table that indicates, for each turn radius of a plurality of different turn radii, a minimum travel speed at which the front loader equipped mobile machine will tip at each combination of a plurality of different combinations of load weight and load position; and
identifies the minimum travel speed at which the front loader equipped mobile machine will tip using the current weight of the load, the current position of the load, the current turn radius, and the lookup table; and
control logic that controls the front loader equipped mobile machine based on the current travel speed of the front loader equipped mobile machine and the identified minimum travel speed at which the front loader equipped mobile machine will tip.

15. The control, system of claim 14 wherein the control logic controls the front loader equipped mobile machine by reducing a travel speed, of the front loader equipped mobile machine.

* * * * *